(12) United States Patent
Lipman et al.

(10) Patent No.: US 9,924,309 B2
(45) Date of Patent: Mar. 20, 2018

(54) SYSTEM AND METHOD FOR MOBILE DEVICE LOCATION TRACKING WITH A COMMUNICATION EVENT TRIGGER IN A WIRELESS NETWORK

(71) Applicant: YAHOO HOLDINGS, INC., Sunnyvale, CA (US)

(72) Inventors: Sol Lipman, Scotts Valley, CA (US); David Robinson, Palo Alto, CA (US); Jeffrey Bonforte, Sunnyvale, CA (US); Victor Chen, Saratoga, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 0 days.

(21) Appl. No.: 14/959,277

(22) Filed: Dec. 4, 2015

(65) Prior Publication Data
US 2017/0164145 A1  Jun. 8, 2017

(51) Int. Cl.
*H04W 24/00* (2009.01)
*H04W 4/02* (2018.01)
*H04L 29/08* (2006.01)

(52) U.S. Cl.
CPC .......... *H04W 4/021* (2013.01); *H04L 67/306* (2013.01); *H04W 4/025* (2013.01)

(58) Field of Classification Search
CPC ....... H04W 4/021; H04W 4/025; H04W 4/02; H04W 8/08; H04W 64/00; H04W 48/04; H04L 67/306
USPC ....................................... 455/456.3
See application file for complete search history.

(56) References Cited

U.S. PATENT DOCUMENTS

| 7,412,234 B2* | 8/2008 | Zellner ............... H04L 41/12 340/568.1 |
|---|---|---|
| 2008/0045236 A1* | 2/2008 | Nahon ................ H04W 4/12 455/456.1 |
| 2011/0110293 A1 | 5/2011 | Hart et al. |
| 2013/0104035 A1 | 4/2013 | Wagner et al. |
| 2014/0156410 A1 | 6/2014 | Wuersch et al. |

* cited by examiner

*Primary Examiner* — Huy C Ho
(74) *Attorney, Agent, or Firm* — James J. DeCarlo; Greenberg Traurig, LLP

(57) ABSTRACT

Disclosed are systems and methods for location tracking. In one embodiment, an apparatus receives a message sent to a user of a mobile device in a wireless network, and a processor determines at least one location parameter. Data is extracted from the message, and initiation of a computing function (e.g., transmission of a communication to the mobile device) is triggered by a match between the location and the data from the message.

14 Claims, 6 Drawing Sheets

SYSTEM AND METHOD FOR MOBILE DEVICE LOCATION TRACKING WITH A COMMUNICATION EVENT TRIGGER IN A WIRELESS NETWORK

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to location tracking in wireless networks.

SUMMARY

Location tracking can be used to determine the location of a device in a wireless network. Location tracking techniques include, for example, distance based techniques such as Time of Arrival (ToA), Time Difference of Arrival (TDoA), and Received Signal Strength Indication (RSSI), and angle based techniques such as Angle of Arrival (AoA). ToA systems are based on measurement of the arrival time of a signal transmitted from a tracked device to several receiving sensors. TDoA techniques use relative time measurements at multiple receiving sensors to identify the location of the tracked device. In RSSI systems, knowledge of the transmitter output power, cable losses, and antenna gains, and received signal strength of a received packet along with an appropriate path loss model allow for calculation of the distance between the tracked device and a tracking device in the wireless network.

Tracking devices can collect location information about the tracked device, for example, based on transmissions sent from the tracked device. The collected information may be transmitted to a central location, such as a location server.

The present disclosure describes computer systems and methods for determining a location of a user device (e.g., a mobile telephone or smart phone). The location of the user device is matched to a location corresponding to a prior communication sent via a network. In response to this matching, a new communication is transmitted to the user device and/or another computing function is initiated on the user device or another computing device. Some embodiments of the present disclosure are summarized below.

It is recognized in the disclosure herein that determining a location of a mobile device in a wireless network, and coordinating this determination with a triggering event that causes a new computing function (e.g., the transmission of a new communication) is a technical problem for network communication and other server based technologies. Embodiments herein provide one or more technological solutions in the realm of one or more of location tracking, real-time communications across a network, computers, or the Internet to improve the performance of, and technology of, location tracking, communication and messaging software, and systems and servers by providing automated functionality that effectively and more efficiently manages location tracking and related automatic triggering of new computing events in the network based on said tracked locations in ways that cannot effectively be done, or done at all, manually.

In accordance with one or more embodiments, a method is disclosed which includes receiving, over a network, electronic communications sent to a user, each communication associated with a respective location; storing the received communications in a data repository; determining, by at least one processor, a location of a user device of the user; identifying, by the least one processor, a first communication of the received communications, the identifying based on matching the location of the user device to the respective location of the first communication; in response to the identifying, generating, by the least one processor, a new communication; and transmitting, over a network, by the least one processor, the new communication to cause a display in a user interface of the user device.

In accordance with one or more embodiments, a non-transitory computer-readable storage medium is provided, the computer-readable storage medium tangibly storing thereon, or having tangibly encoded thereon, computer readable instructions that when executed cause at least one processor to perform one or more of the above methods.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
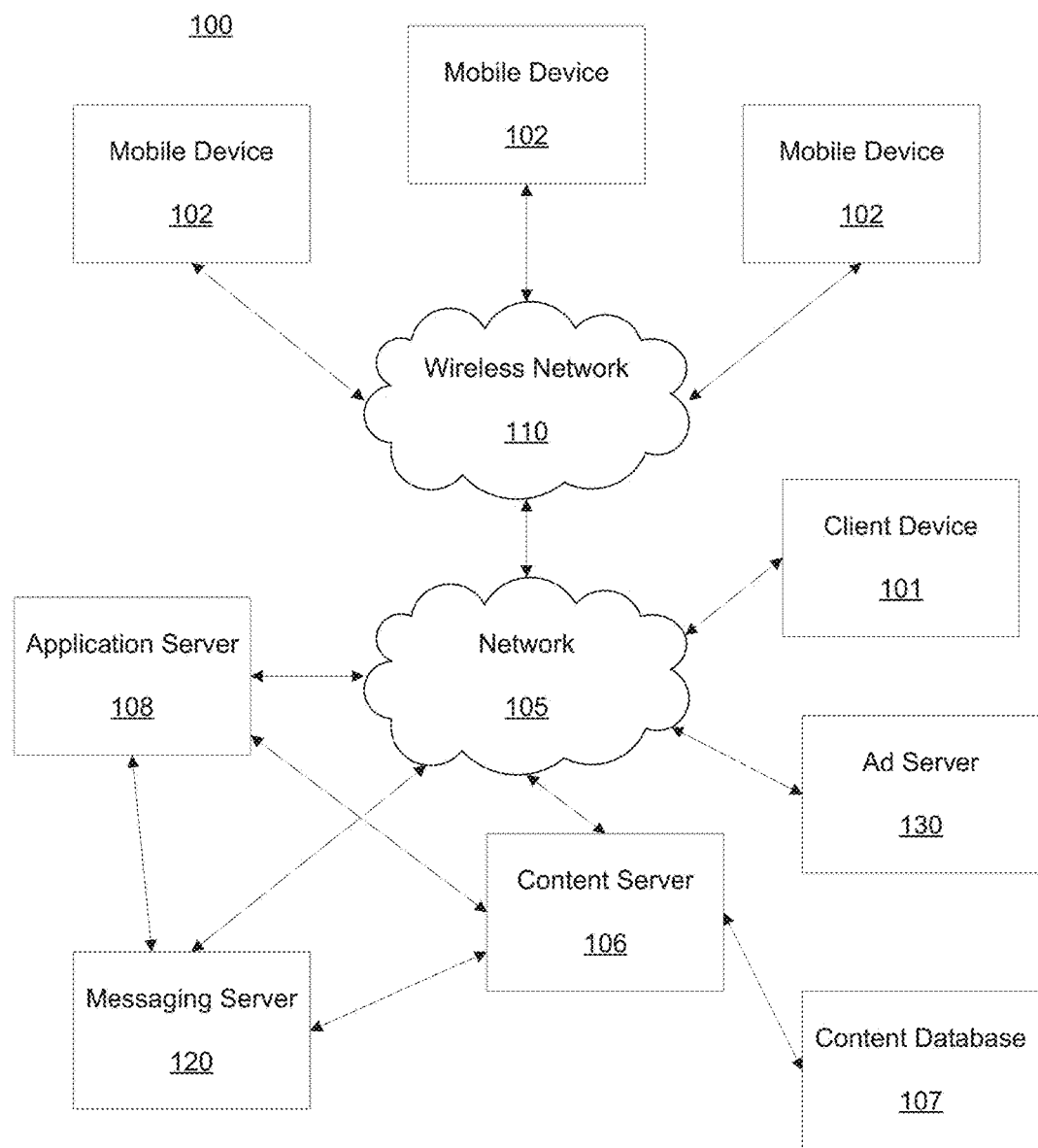
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As used herein, the term "location" refers to a geographic location, for example such as a longitude/latitude combination, a postal code, an area code, or a street address. The term "location" is also used herein in reference to a physical location associated with a user, a retail outlet (e.g., store, theater, restaurant, etc.), or other similar physical locations, or other detectable and quantifiable point or area of physical space.

As used herein, the term "geofence" refers to various regions or boundaries of interest that include a geographic area, for example within a distance or other defined physical relationship relative to a particular location or point of interest. However, a geofence need not be limited to any geometric shape or an arbitrary boundary drawn on a map. A geofence can be used to determine a geographical area of interest for calculation of demographics, advertising, or similar purposes.

Geofences can be used in conjunction with advertisement generation or communication delivery as discussed herein. For example, a geofence can be used to assist in determining whether a user (or mobile device associated with the user) is within a geographic area of interest to a particular service provider or advertiser (e.g., a local vendor or merchant). In one embodiment, if the user is within a geofence established by the merchant, systems discussed herein can use that information to generate a notification, dynamic advertisement, or other communication from the advertiser and deliver it to the user (e.g., via a mobile device associated with the user).

The present disclosure generally relates to location tracking and generation of a computing event in response to a trigger such as, for example, a location match to one or more prior communications received by a user device or otherwise sent to a user (e.g., addressed to the user). The present disclosure improves at least the technologies of location tracking, communication serving, and communication identification.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a liquid crystal display (LCD), LED or OLED display for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via an email application such as Yahoo!® Mail, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices 102 and client device 101. FIG. 1 additionally includes a variety of servers, such as content server 106, application (or "App") server 108, messaging server 120 and advertising ("ad") server 130.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, phablets, integrated devices combining one or more of the preceding devices, and the like. As such, mobile devices 102 typically range widely in terms of capabilities and features. For example, a cell phone may have a numeric keypad and an LCD display on which only text may be displayed. In another example, a web-enabled mobile device may have a touch sensitive screen, a stylus, and a color LCD or LED display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client device 101 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized with an electronic social networking site (e.g., a new computing function or communication that is initiated or generated in response to a triggering event associated with location tracking of a user device, as discussed below, may include social network data collected for a person from a social networking site using an API of the site). An electronic social network refers generally to a network of individuals, such as acquaintances, friends, family, colleagues, or co-workers, coupled via a communications network or via a variety of sub-networks.

Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multimodal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device (e.g., the content may be included in a newly-generated communication triggered based on location tracking, as discussed below). A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like (e.g., these services may use or be based on aggregate objects as described below). Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users (e.g., the advertisements may be included in a new communication generated as described for FIG. 4 below). "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information.

In one example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
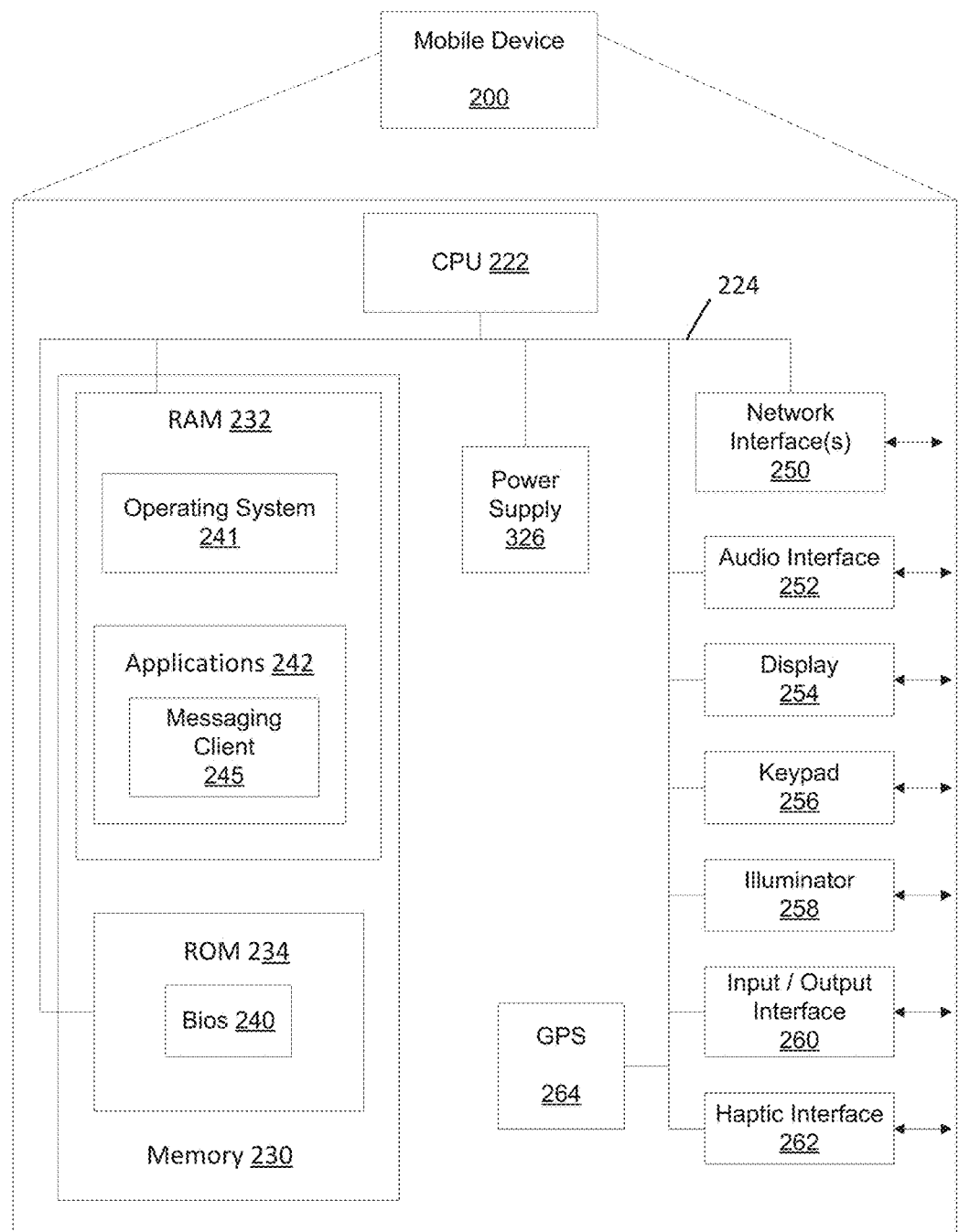
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, mobile or client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), Long Term Evolution (LTE), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), OLED, or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Figure 4:
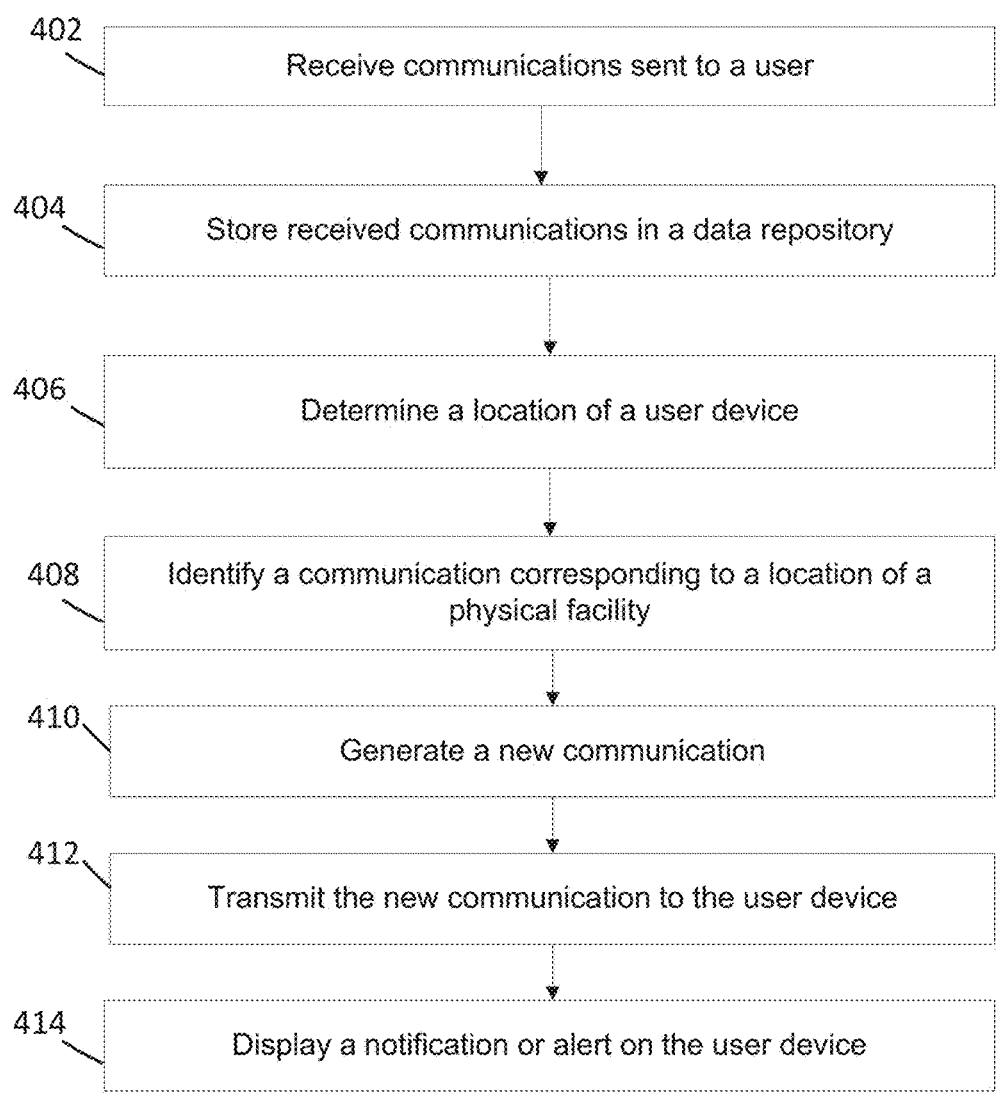
FIG. 4 is a flowchart illustrating steps performed in accordance with some embodiments of the present disclosure.

Applications 242 may include computer executable instructions which, when executed by client device 200, transmit, receive, and/or otherwise process audio, video, images, and enable telecommunication with another user of another client device (e.g., applications 242 may include an email or other manager that provides a user interface to a user for displaying new communications, alerts, or other data to the user; data for display to the user may be derived, for example, from a new communication as discussed for FIG. 4 below).

Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, IMs, or the like.

Having described the components of the general architecture employed within the disclosed systems and methods, the components' general operation with respect to the disclosed systems and methods will now be described.

Figure 3:
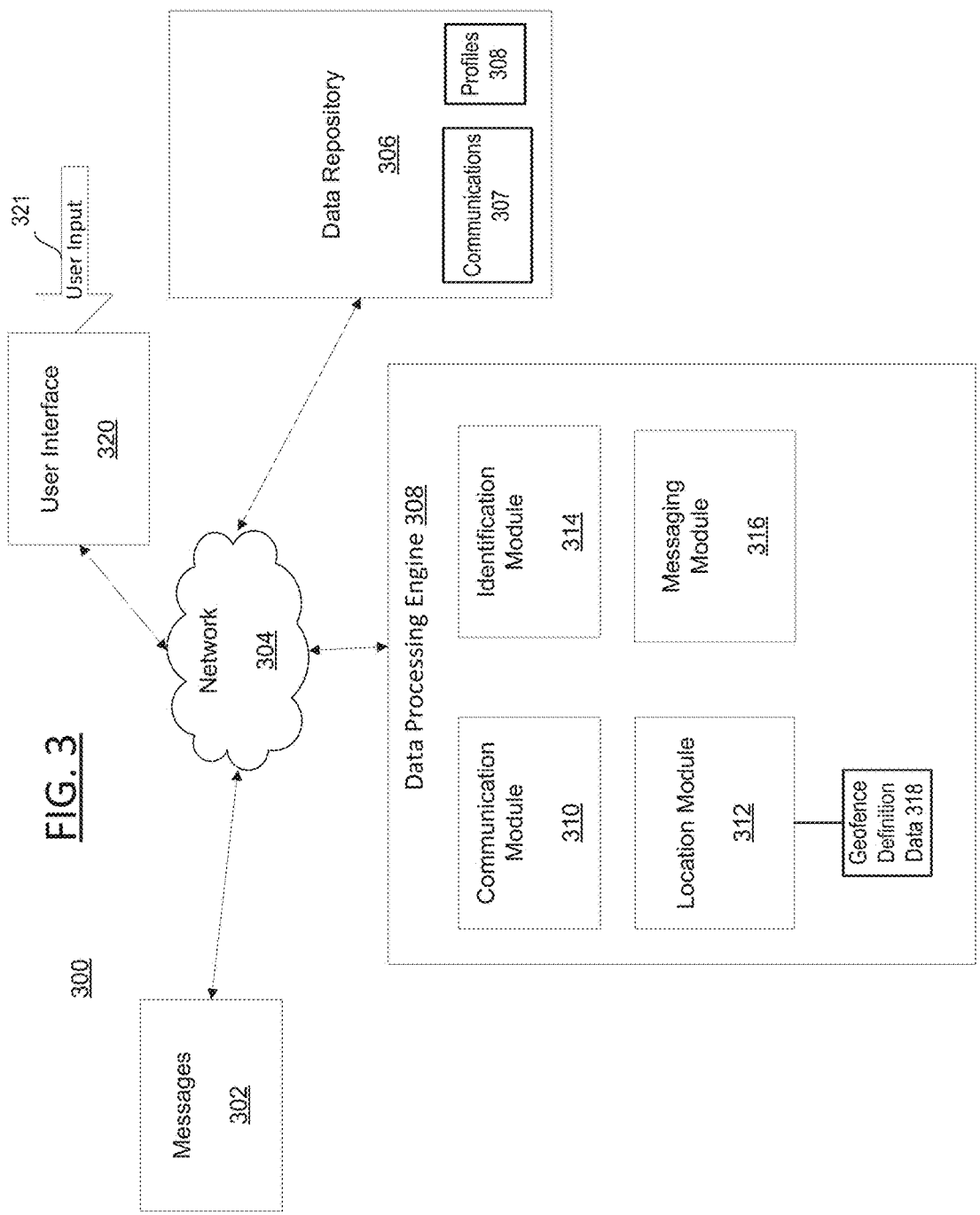
FIG. 3 is a schematic block diagram illustrating components of a system in accordance with embodiments of the present disclosure.

FIG. 3 is a block diagram illustrating the components of sub-system 300 for performing the systems and methods discussed herein according to some embodiments. A data repository 306 stores communications 307 that have been received by a user of a user device. Communications 307 may store data related to, for example, e-mail communications, text messages, and voice communications. The data repository 306 also stores profiles 308. Each of these profiles corresponds to a particular user of a user device. A given profile 308 may include, for example, desired operating parameters associated with management of services provided to a user device and/or management of communications associated with the user device.

Data processing engine 308 includes a processor (not shown) to execute communication module 310, location module 312, identification module 314, and messaging module 316. As described in more detail below, the processor of data processing engine 308 executes various program logic including: communication logic executed by the processor for receiving, over a network, the electronic communications, and for transmitting, over the network, a new communication to cause a display in a user interface of the user device; location logic executed by the processor for determining a location of the user device; identification logic executed by the processor for identifying a first communication of the received communications, the identifying based on matching the location of the user device to the respective location of the first communication, and the identifying comprising accessing the data repository; and generation logic executed by the processor for, in response to the identifying, generating the new communication.

FIG. 3 further includes messages 302 (e.g., messages sent to or received by a user and saved or stored or otherwise accessible to the network for retrieval or use as described herein), a network 304, a user interface 320 (e.g., a display of a mobile device for a user to provide user input 321). The data processing engine 308 could be hosted by a web server, content provider, email service provider, ad server, a user's computing device, an application server, or any combination thereof.

As described in more detail below, new communications (e.g. messages in differing formats) are generated in response to the triggering event. In one embodiment, this triggering event is a matching of a user device location to location associated with one or more prior messages 302.

The messages 302 can be any type of message. Examples of such messages can include email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages or other input data can be provided to the data processing engine 308 or accessed by a computer program or device that can access the input data. In some embodiments, data related to messages 302 can be stored in a database in data repository 306, which may be associated with an email provider, such as Yahoo! Mail®. The database can be any type of database or memory that can store the messages and related data.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be communicated and/or accessed and processed by the data processing engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between messages 302, the data processing engine 308, and the data repository 306.

The principal processor, server, or combination of devices that comprises hardware programmed in accordance with the special purpose functions herein, referred to for convenience as data processing engine 308, includes communication module 310, location module 312, identification module 314, and messaging module 316, as mentioned above. In various embodiments, location module 312 determines a location of a user device, as discussed in more detail below. In some embodiments, location module 312 accesses geofence definition data 318 in order to determine whether a user device has a location that is within a geofence. Geofence definition data 318 may be, for example, data that defines a geographic, local, regional, spatial or other physical or imaginary boundary. In one embodiment, location module 312 determines that a user device is within the geofence based on a determination that the user device is within this boundary.

It should be understood that the engine(s) and modules discussed herein are non-exhaustive, as additional or fewer engines and/or modules may be applicable to the embodiments of the systems and methods discussed. The operations, configurations and functionalities of each module, and their role within various embodiments of the present disclosure are discussed with reference to FIG. 4.

FIG. 4 is a process 400 diagram illustrating steps performed in accordance with embodiments of the present disclosure for generating a new communication in response to matching a location of a user device (e.g., a mobile device 102 of FIG. 1) as discussed in more detail below. In one embodiment, process 400 is performed by the data processing engine 308.

Process 400 begins with Step 402 where communications (e.g., messages 302 of FIG. 3) are received by a user of a user device. This step is performed by the data communication module 310 of the data processing engine 308. Step 402 receives at least one communication over one or more networks, such as network 105 or 304. These are communications sent to the user (e.g., addressed by the sender to the user as a To: or Cc: recipient). For example, one of the communications may be addressed primarily to the user. In other cases, the user may be copied on the communication (e.g., as a Cc: recipient).

In Step 404, the communications that are received are stored in a data repository. In one embodiment, this repository is data repository 306, and the received communications are one of communications 307.

In Step 406, a location of the user device of the user that has received the communications is determined. In one embodiment, it should be noted that a location of the user device is determined prior to the user actually receiving and reading a communication on her user device.

In Step 408, one of the communications received in Step 402 is identified as corresponding to a location of a physical facility. This facility may be, for example, a store or other service location of a vendor (sender) that has previously sent the communication to the user (e.g., a few hours, days, or weeks prior to the current time). For example, the communication may provide a link or data associated with a physical item to be picked up by the user at the physical facility, or a service to be provided to the user at the facility. In one embodiment, the identification of this communication is performed prior to the user actually receiving and reading a communication on the user device. For example, a server that has received the communication can perform this identification using data repository 306.

In Step 410, a new communication is generated in response to the identification of the communication of Step 408. The new communication, for example, may provide an alert or reminder to the user regarding the subject matter of the communication identified in Step 408. For example, this new communication can alert the user that she is within a predetermined distance of the physical facility so that the user can take action based on this alert.

In another embodiment, the notification can be used to cause the user device to perform a computing function related to the physical facility or the communication identified in Step 408. This computing function does not necessarily require that the user be aware that the function is being performed. However, in some embodiments, the user is made aware of the function by a display or other user interface event.

In Step 412, the new communication generated in Step 410 is transmitted to the user device. In one embodiment, the new communication is sent to a server or other computing device prior to receipt by the user device. Such other computing device may perform a computing function in response to receiving the communication. This computer function may relate to the service to be provided to the user at the physical facility.

In Step 414, a notification or alert is displayed on the user device. In one embodiment, this notification or alert is in response to the user device receiving the new communication. In another embodiment, the notification or alert is generated in response to the server or other computing device discussed immediately above having received the new communication.

In one embodiment, a method includes receiving, over a network, electronic communications sent to a user, each communication associated with a respective location; storing the received communications in a data repository; determining, by at least one processor, a location of a user device of the user; identifying, by the least one processor, a first communication of the received communications, the identifying based on matching the location of the user device to the respective location of the first communication; in response to the identifying, generating, by the least one processor, a new communication; and transmitting, over a network, by the least one processor, the new communication to cause a display in a user interface of the user device.

In one embodiment, the matching is based on determining that the location of the user device is within a geofence associated with the respective location of the first communication. In one embodiment, the display comprises at least a portion of the first communication.

In one embodiment, the method further includes: extracting data from each of the received communications, including the first communication; storing the data in a data repository; and accessing data from the data repository for the first communication, the display to include the accessed data. In one embodiment, the first communication may include metadata, and the extracting data from the first communication may be performed using the metadata. In one embodiment, the extracting data may include extracting data from the first communication based on prior activity of the user device.

In one embodiment, the method further includes associating an expiration with the first communication, wherein the transmitting the new communication is subject to determining a status of the expiration. In one embodiment, the method further includes receiving parameters from the user device, wherein the identifying is controlled by the parameters.

In one embodiment, the method further includes generating a profile for the user device, the profile comprising data collected from prior network interactions with the user device, wherein the display comprises information selected based on the profile. In one embodiment, the method further includes receiving a profile from the user interface, wherein the generating the new communication is subject to the profile.

In one embodiment, the method further includes automatically identifying computing devices of senders that meet relevancy criteria, wherein the transmitting the new communication is subject to a computing device of a sender of the first communication conforming to the relevancy criteria.

In one embodiment, a system includes: a data repository to store electronic communications sent to a user of a user device, each communication associated with a respective location; at least one processor; and a non-transitory computer-readable storage medium for tangibly storing thereon program logic for execution by the processor.

The program logic includes: communication logic executed by the processor for receiving, over a network, the electronic communications, and for transmitting, over the network, a new communication to cause a display in a user interface of the user device; location logic executed by the processor for determining a location of the user device; identification logic executed by the processor for identifying a first communication of the received communications, the identifying based on matching the location of the user device to the respective location of the first communication, and the identifying comprising accessing the data repository; and generation logic executed by the processor for, in response to the identifying, generating the new communication.

In one embodiment, the matching is based on determining that the location of the user device is within a geofence associated with the respective location of the first communication. In one embodiment, the program logic further comprises extraction logic to extract data from each of the received communications, including the first communication, and wherein the generation logic further accesses the data extracted from the first communication when generating the new communication, the new communication to comprise the data extracted from the first communication. In one embodiment, the first communication comprises metadata, and the data is extracted from the first communication using the metadata.

In one embodiment, a non-transitory computer-readable storage medium tangibly encoded with computer-executable instructions, that when executed by at least one processor associated with a computing system, performs a method including: receiving, over a network, electronic communications sent to a user of a user device, each communication associated with a respective location; storing the received communications in a data repository; determining a location of the user device; identifying a first communication of the received communications, the identifying based on matching the location of the user device to the respective location of the first communication, and the identifying comprising accessing the data repository to obtain location data; in response to the identifying, generating a new communication; and transmitting, over a network, the new communication to the user device to cause an event on the user device.

In one embodiment, the matching is based on determining that the location of the user device is within a geofence associated with the respective location of the first communication. In one embodiment, the method further comprises extracting data from each of the received communications, including the first communication, and including the data extracted from the first communication in the new communication that is generated.

In one embodiment, the event is the providing of a display of at least a portion of the first communication. In one embodiment, the extracting data includes extracting data from the first communication based on prior activity of the user device, and the method further includes generating a profile for the user device, the profile comprising data collected from at least one prior communication with the user device, wherein the event comprises display of data selected at least based on the profile.

Figure 5:
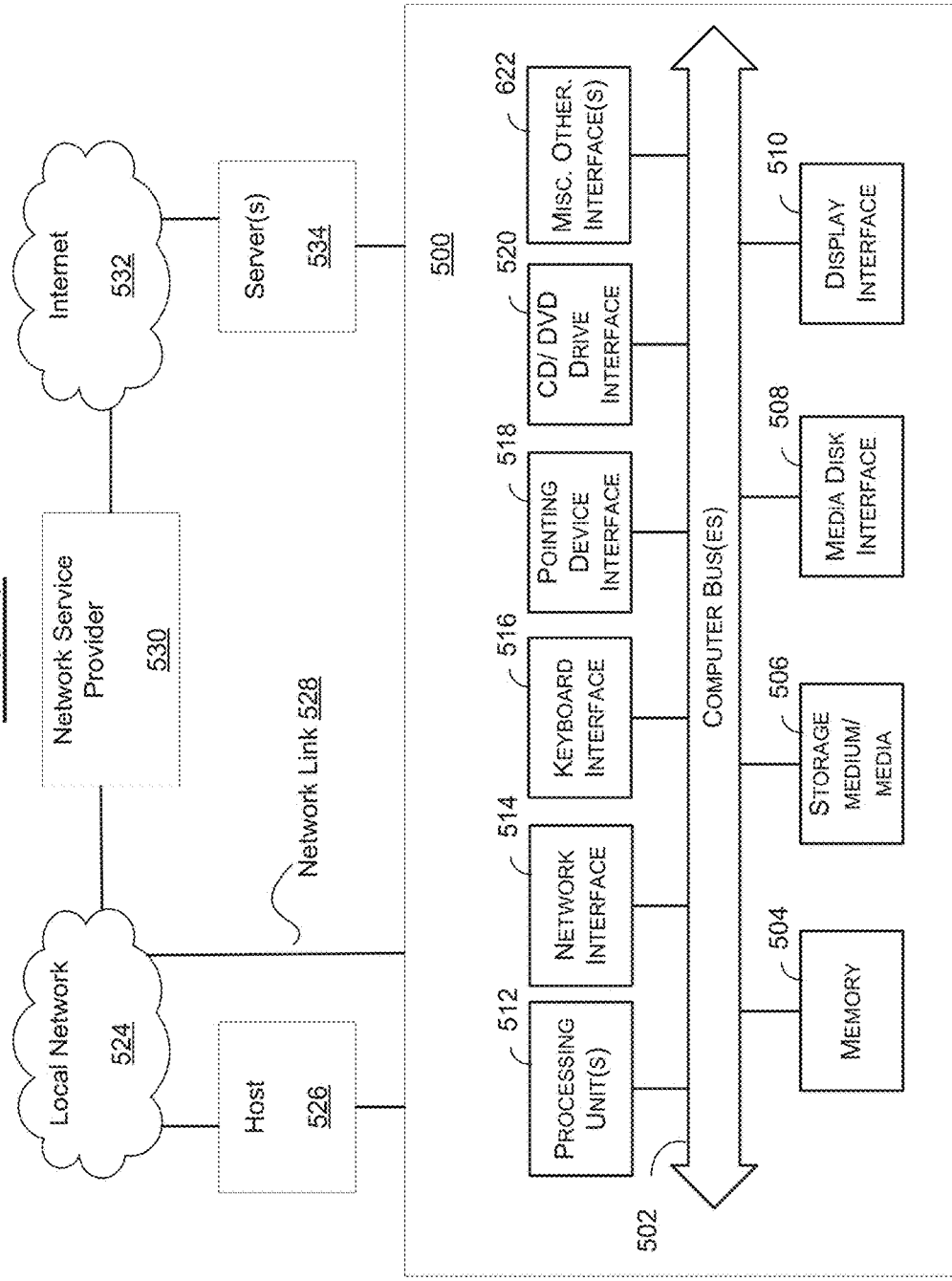
FIG. 5 is a block diagram illustrating an architecture of a hardware device in accordance with one or more embodiments of the present disclosure.

As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 505, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein (e.g., one or more of the process flows described herein). CPU 512 first loads computer executable process steps from storage, for example, memory 504, computer readable storage medium/media 506, removable media drive, and/or other storage device. CPU 512 can then execute the stored process steps in order to execute the loaded computer-executable process steps. Stored data (e.g., data stored by a storage device) can be accessed by CPU 512 during the execution of computer-executable process steps.

Persistent storage, for example, medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, for example, listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some of the techniques described herein. Although computer system 500 may be used in conjunction with certain of the techniques herein, computer system 500 is configured as a new, specific machine in accordance with at least one of the technological solutions described above.

According to one embodiment, these techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

Figure 6:
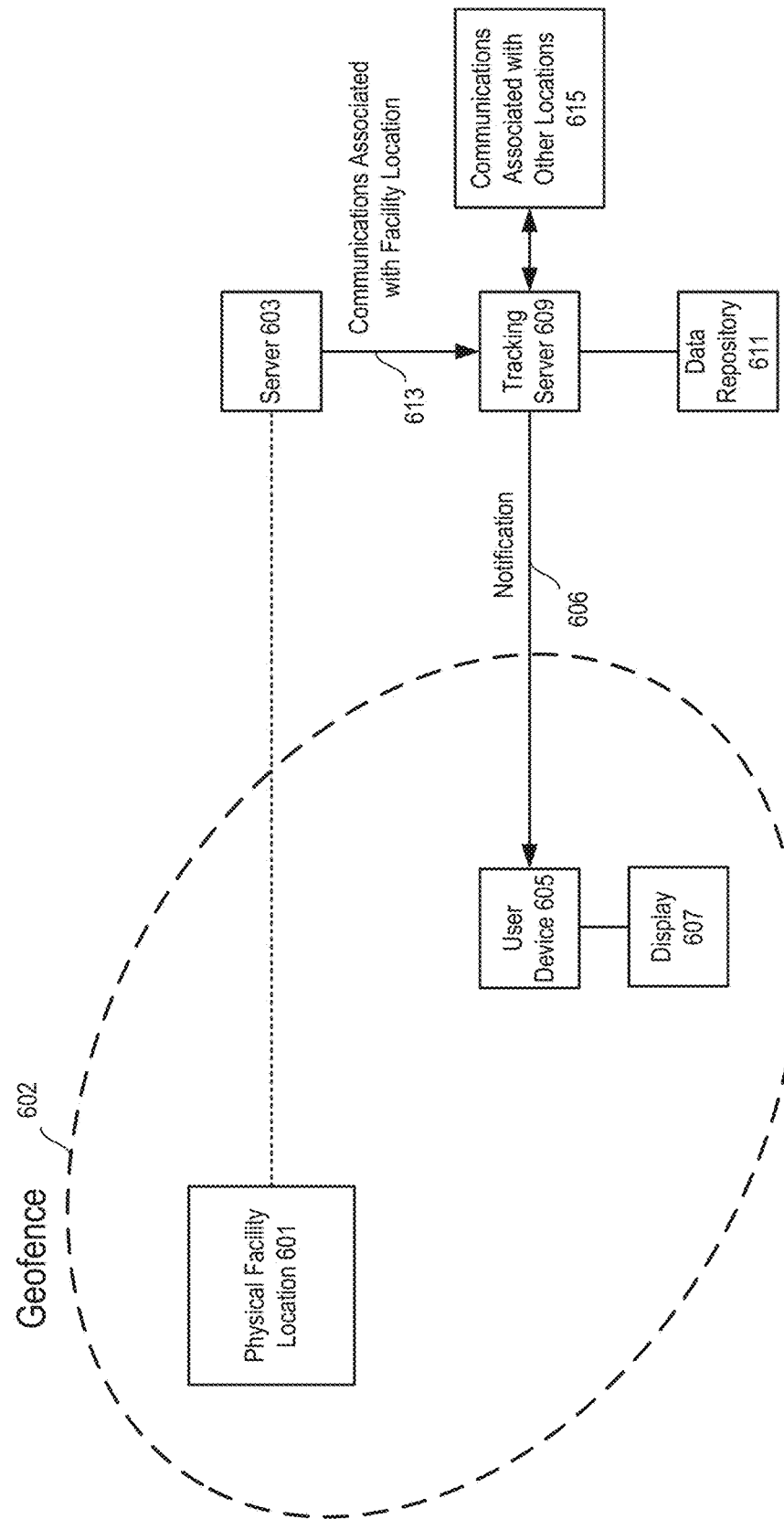
FIG. 6 illustrates a system to track a location of a user device and generate a new communication to the user device in response to a triggering event, in accordance with one or more embodiments of the present disclosure.

FIG. 6 illustrates a system to track a location of a user device 605 and generate a new communication to user device 605 in response to a triggering event, in accordance with one or more embodiments of the present disclosure. The triggering event may be, for example, the identification of a communication that has been received which has a location that matches or corresponds to a currently-determined geographic location of user device 605.

In one embodiment, the location of user device 605 is determined to be within geofence 602. This location is determined to match a location of a prior communication sent to the user of user device 605. The prior communication was sent, for example, by a merchant or other product/service provider. The merchant has a physical facility location 601. In one embodiment, location 601 is considered to be associated with communications sent to the user from the merchant. When the system determines that user device 605 is located within geofence 602, a notification 606 is generated as a new communication and sent to user device 605. An alert or other notification is provided to the user on display 607 of the user device 605.

The identification of the prior communication is performed by tracking server 609. In one embodiment, tracking server 609 includes data processing engine 308 of FIG. 3. Tracking server 609 accesses data stored in data repository 611. In one embodiment, a data repository 611 stores communications 307 and profiles 308 of FIG. 3.

Tracking server 609 receives various communications from numerous sources and senders. One of these sources is server 603 (e.g., operated by the merchant above) which sends communications 613 that are received by tracking server 609. One or more of these communications are addressed to the user of user device 605.

Physical facility location 601 is associated with communications 613 sent by server 603. Data repository 611 stores data that associates communications 613 with physical facility location 601. Tracking server 609 accesses this stored data when determining whether the location of user device 605 matches a location of a received communication.

Tracking server 609 receives communications from numerous sources as mentioned above. As various communications 615 are received by tracking server 609, a determination is made whether one or more of these communications are associated with a location that matches the currently-determined location of user device 605. For example, one of communications 615 may be from a different merchant that also has a physical facility location within geofence 602.

In one embodiment, server 603 is associated with multiple physical facility locations in addition to location 601. These other facility locations may correspond to one or more different geofences.

In one embodiment, the notification 606 provided to user device 605 may include data that has been extracted from one or more of the received communications 613. Data extracted from these communications may be stored in data repository 611. Tracking server 609 accesses this data when generating a new communication. This data may be stored in advance of the determination that a user is at a current location (e.g., stored when the prior communication was first received from the sender).

In one embodiment, the sending of notification 606 to user device 605 is subject to tracking server 609 determining that a sender of communications 613 meets relevancy criteria established by the user. This relevancy criteria may provided as parameters from user device 605, and also stored as a part of a user's profile 308 in data repository 611.

System and Method Variations

Various additional non-limiting embodiments and examples are now discussed below. These embodiments and examples are not intended to limit the generality of the foregoing disclosure.

In one embodiment, various types of extractions of data from received communications is performed in order to understand the content in the messages and present new product or service opportunities to an end user. For example, shipping information in a communication to a user can be extracted. The shipping information is provided to the user (e.g., in a card) when the user logs-in to her mail. Using the system of the disclosure above, data is extracted from messages sent by vendors with physical locations. The user is automatically (or as adjusted by a user setting) reminded of this prior email or other message when the user is near the relevant store (e.g., the store vendor that sent the prior email to the user). When the user is at the store (or nearby, such as within a geofence) the email appears with a push notification on the user's phone giving the user the relevant data (e.g., weekly deals, coupons, news, service info, etc.).

In one embodiment, at least one of the technological solutions provided above helps a user to remember the existence of a relevant prior email or other message when the user is presently determined to be (e.g., by location tracking) in a cogent or otherwise relevant physical location associated with the prior email or message. There are various ways to implement this service, but in one example, a list is stored for a predetermined number of top email senders who have corresponding physical locations (e.g., Target, Walmart, Starbucks, Subway, etc.). Email or other messages from these vendors is filtered and processed as discussed above. A user can be provided with a manual control option. For example the user may be presented with a button that activates a reminder feature. As an alternative to this button, a global setting may be provided in a mail service for the user to set.

In one embodiment, geofencing is added into a Yahoo! Mail or other mail application on Android and iOS. When a user is within a predefined distance (e.g., 250 meters) of a specific location, a predefined geofence triggers sending of a push notification that is a reminder of the prior email. When the user accesses the push notification, the user is taken directly to that prior email (e.g., with a map displayed along with the email to help the user find the location of the vendor that sent the prior email). Coupons or other information associated with the e-mail may also be presented to the user. The presentation of this information to the user may be triggered by the receipt of notification 606 from tracking server 609.

In one embodiment, various monetization techniques or models may be used in connection with the sending of notifications 606. For example, a vendor may pay a service fee for each such notification that is sent to user device 605. The notifications may include advertising associated with the user. Such advertising may include sponsored search advertising, guaranteed and non-guaranteed delivery advertising, ad targeting, ad serving and ad analytics. The advertising may include deals/coupons that the user would otherwise need to devote much searching time and effort to locate. The user might also forget about the existence of the coupons.

In one embodiment, the extraction of information from emails is performed to extract particular information that is relevant to a user. For example, a package tracking number can be extracted. Such extraction may be done when the user purchases something at, for example, Amazon. This extracted information is then later presented to the user in a different, more useful way when the new communication is generated and sent to user device 605 as discussed above. This extraction also may be done with sporting and other events, and flight and other travel information.

In one embodiment, a retailer has numerous physical store locations. If a user is physically located at a particular store, the user may have indicated a desire for (or previously enabled) a feature to automatically locate and display a location-relevant prior e-mail from the retailer. The system described above extracts data regarding related coupons and other deals for the user that can be used by the user at the store at the current location of the user.

In one embodiment, when a user is located at a retailer from which the user has previously received an e-mail, a notification 606 is generated that will notify user device 605 that there are coupons or other information available for use by the user at this location. The user can be notified by a push notification of such information, or the user can initiate a request for updating of such information by pressing a button or otherwise activating this feature in a user interface of user device 605.

In one embodiment, the location of a user device 605 is passively tracked. Coordinates of the user location are matched with previously received messages that are associated with the user location. The determination of a match is a triggering event that causes the sending of notification 606 and/or initiating another computing function on user device 605 (and/or causing a computing function on yet another server or computing device).

In one embodiment, the data extracted from a received communication is reformatted (e.g., to make it simpler for the user to read, or simpler to access). In another embodiment, the original prior e-mail itself is displayed or highlighted for the user when user device 605 is determined to be at a specific location that corresponds to a location associated with the prior e-mail.

In one embodiment, notification 606 may trigger the display of an inquiry to the user regarding whether the user desires to see certain of various types of information that are available (and that are associated with the user's present location). For example, the notification might provide a short summary of various deals that are associated with the user's current location.

In one embodiment, a form of new notification can be provided or displayed in the user's inbox when the user is at a location corresponding to a prior e-mail received from a store or other physical facility at that same location. In one embodiment, a list of vendors or other senders of communications for which the notification service is provided are determined by storage of a list as data in data repository 611. In another embodiment, a predetermined number of highest volume or most relevant senders of messages can be determined. Then, the system is implemented for these particular senders.

In one embodiment, as part of a monetization technique, vendors themselves enroll in a notification service. As part of this service, the vendor includes some form of data or information in a communication (e.g., in the metadata of an e-mail) that facilitates extraction of information by tracking server 609. In one embodiment, the metadata identifies what parts of the message are to be extracted by tracking server 609. The vendor can be charged for a notification service on subscription basis. For example, there could be a charge for this service that sets a fee for a particular number of e-mails that are pushed to a user. The vendor can also put a tag in each message to assist in making data readily extractable under this service.

In one embodiment, the physical locations of the vendors are determined and stored in data repository 611. This can be done, for example, by using various services (e.g., Yelp, Foursquare, or API).

In one embodiment, the system is implemented with regard to competitors of a vendor. For example, if a user is at a Target location, a competitor of Target could have information presented to the user. The user interest in such information may be based by analysis of prior e-mails to the user by tracking server 609. In one embodiment, an online auction could be conducted when a person is at a location. Vendors and competitors could participate in the auction to determine who can send a notification to the user.

In one embodiment, the user has access to a button that enables or disables notification regarding prior e-mails as discussed above. This button lets the user turn the feature on or off. Information regarding the user's selection is stored as an update the user's profile.

In one embodiment, there is an expiration date associated with the new communication generation step. For example, an expiration date is established for a coupon or other information in a prior communication so that a user is only presented with information that is still relevant and active at the time that the user is present at a current location.

In one embodiment, the providing of notifications to the user is customized for each user. This personalization is based on other interest factors that tracking server 609 has obtained for the user (e.g., based on other activities of the user on the Internet, or on a service hosted by tracking server 609).

In one embodiment, a user has already received one or more e-mails from a particular vendor. Interest factors associated with the user are used to select coupons related to a particular product area (e.g., back-to-school items) because tracking server 609 has received data indicating that the user is related to that product area (e.g., is a student). These factors may be based on other information acquired for the user via a messaging or other service provided to the user that is accessible to tracking server 609, and/or based on prior communications and data obtained and/or received for a user.

Location Tracking Variations

Various non-limiting embodiments and examples related to location tracking, which may be used with the disclosure above, are now discussed below. These embodiments and examples are not intended to limit the generality of the foregoing disclosure.

In one embodiment, a location tracking computing device or module collects geolocation information that is used to make a location determination. Geolocation information may be data or other information which identifies a geographical location of a person or resource. The information can have various formats and precision and content. One source of geolocation information is the Global Positioning System (GPS). Terrestrial devices receive transmissions from orbiting satellites of the GPS system and use information contained in the transmissions to determine their position. The determined position information typically includes latitude, longitude and elevation. Additional information that may be derived includes a heading and speed if the device is in motion.

Various apparatus have been developed for use by a user. These include stand-alone, handheld devices and software applications operable in conjunction with hardware devices such as smartphones to produce a GPS receiver. These devices may display geolocation data such as latitude and longitude. In addition, these devices may combine the geolocation data with map data to produce a graphical image showing a determined location on a map. Additionally, aerial view information may be available so that the device may combine the determined location on an aerial view of the surrounding region and even combine the map information, the aerial information and the determined location.

In addition to having the geolocation information available at a mobile or handheld device, other systems have been developed to convey that geolocation information to a remote location. For example, tracking software can be installed on a remotely located computing device such as a hosting server. The tracking software communicates with client-side javascript files for display on a client device of maps with the geolocation information for a tracked device. Network functionality, such as the Internet, permits the display to be updated. These systems for remote tracking can be used, for example, for tracking fleet vehicles or delivery or service vehicles or personnel.

A data retrieval server may be configured to receive geolocation data over a network from one or mobile sources. In an exemplary embodiment, the mobile sources provide geolocation data on a real-time basis. For example, each of the mobile sources (e.g., a mobile device) may be a self-contained location monitoring device and include a global positioning system (GPS) receiver, control processor for determining the location of the mobile source based on received GPS data from GPS satellites, a terrestrial radio transceiver for communicating with the network and a battery for powering the mobile source. The system may, for example, determine location once at least every second and transmit its data every at least three seconds. It may include a cellular transceiver for communicating with a cellular radio network and thereby communicating with a server system. Other examples of mobile sources include suitably equipped handheld GPS devices, mobile phones and smart phones. Any device capable of tracking an asset or individual may be the source of the data received by the geolocation server system.

The geolocation data may be received on a real-time basis. For example, the geolocation data from the mobile sources is updated in approximately the same time during which the mobile source is active to ensure that the location provided for the mobile source by the device is accurate at any given time, depending on conditions. For example, when a mobile source detects that it is stationary, it may reduce its update frequency or the transmission of updated information in order to conserve battery life. Under different conditions, such as moving at a high rate of speed, the device may increase its update frequency in order that its location may be tracked with high accuracy, at about the same time the device is moving. Received geolocation data from a mobile source may be stored in a database.

A gateway server may be configured to communicate with a remote map server. This communication is over any suitable communications network such as the Internet. The map data server stores map data for access over a network. The stored map data may include map information for a specified mapped area or graphical display information such as an aerial view of a mapped area. The map data may be retrieved by providing a suitable request, such as address information or GPS coordinates. An example of a map data server is the system provided by Google Maps.

The gateway server provides the GPS coordinates received from a mobile source by the data retrieval server to the map data server as a request over the network. The request may also specify the type of graphical display information to be retrieved, such as aerial view data. In response to the request, the map data server provides the specified map data over the network.

Map data including graphical display information are stored in a database. The gateway server reverse-geocodes the received GPS coordinates to determine a physical address for the location of the transmitting mobile source. The physical address is stored in the database.

In one embodiment, as updated GPS coordinates or other geolocation data are received by the data retrieval server, they are provided to the map data server and updated map data is received and combined with the updated geolocation data. In this manner a graphical display of location of the mobile source which originated the geolocation data may be updated, in real-time. In this manner an icon or other representation of the mobile source may be displayed on a video display (e.g., of a mobile device) along with the map data to convey a visual understanding of the geographical location of the mobile source and produce a graphical location display.

In one embodiment, a GPS device or other mobile source sends location information to a geolocation server system.

The GPS device may be any asset or person whose location is desired to be tracked. The GPS device is equipped with an apparatus such as a GPS receiver that develops location information for itself and can report that location information. The GPS device may have features that enable it to be tracked by the geolocation server system. For example, it may be assigned and communicate an identification code that must be matched at the server system, or it may encrypt its transmissions so that the geolocation server system only can correctly decrypt or decode them. The location information may be in any suitable format, such as GPS coordinates, latitude and longitude or a physical address or street address. The location information may be communicated using any suitable method such as internet protocol format conveyed over the internet and related networks. A mobile data network such as a cellular network or WiMAX network may form one or more legs of the communication network between the GPS device and the geolocation server system. The transmitted data is received at the geolocation server system and stored.

The geolocation server system combines the received location information with map data. The map data may be generated locally from any suitable source or may be received separately from an external source over a network such as the internet.

An authorized user provides a publishing request to the geolocation server system. The geolocation server system receives the publishing request from the authorized user of the geolocation information. The request is to share information for the GPS device or other mobile source. In response, the geolocation server system provides to the authorized user a publishing code for incorporation in any web page or a URL for a web page to be displayed by the authorized user or another user. The publishing code or URL are provided in order to share with the authorized user or the other user substantially real time location for the GPS device or other mobile source.

Other alternative embodiments are now described below for location tracking of a device within a wireless network. Various measurement techniques may be used, including, for example, Time of Arrival (ToA), Time Difference of Arrival (TDoA), Received Signal Strength Indication (RSSI), Angle of Arrival (AoA), or other techniques used to track the location of a device. In ToA and TDoA systems, location information collected is the time of arrival, which is most reliable if all tracking devices receive the same packet, record its timestamp and forward it to a location server. Since the ToA algorithms are computationally intensive, it is preferred that the system process only packets specifically intended for location tracking. For RSSI based systems, different packets may be transmitted with different transmission powers. For example, the first few transmissions after a channel change, transmissions at different physical rates, and retries are all sent at variable transmission powers. Thus, it is preferred that the tracking devices record the RSSI of the same packet.

Location tracking information may be collected from a location tracking packet that is transmitted in response to a specified transmission, identifies the tracked device, and identifies the packet as a location tracking packet. The location tracking information is obtained from the same transmission and location processing is performed for the most part, only on the location tracking packets.

In some embodiments, a tracked device may be a client device, wireless mobile station, cellular phone, wireless VoIP phone, Personal Digital Assistant (PDA), laptop computer, Radio Frequency Identification (RFID) tag, rogue wireless access point, rogue wireless client, or any other type of device capable of operating in a wireless environment.

A location server may be configured to collect location tracking information from tracked devices. The location server may communicate, for example, via a local area network (LAN) or wide area network (WAN) that includes intermediate network devices (e.g., routers, switches, etc.), which allow for the transmission of data between the tracked devices and the location server. The location server may also be equipped with an antenna for communication with access points through the wireless network. The location server may be implemented as a single location server or may be implemented as multiple servers. The location server may also be in communication with a central controller configured for receiving location services requests and forwarding the requests to the location server or location data to the location server.

Geofencing Variations

Various non-limiting embodiments and examples related to geofencing, which may be used with the disclosure above, are now discussed below. These embodiments and examples are not intended to limit the generality of the foregoing disclosure.

The use of smart phones and other mobile devices with data connections and location determination capabilities is changing the way people shop for products and services, find restaurants and entertainment events, and receive data. Smart phones can provide users with mobile access to the Internet that is quickly becoming fast and ubiquitous. Smart phones also commonly include mechanisms, such as Global Positioning System (GPS) receivers, that allow the devices to receive and constantly update location information.

Accordingly, the availability of portable implementations of locating technologies via mobile GPS capabilities and network assisted GPS in modem mobile devices (e.g., cellular telephones) is rapidly increasing. Furthermore, in many cases of Internet usage, a user's location can be established to varying degrees of confidence by other means such as Internet Protocol (IP) to location lookup. In addition, other location or location-related information may be known about a given user, such as home or office location, based on a user profile in the case of a logged-in user, or from Internet service provider (ISP) records. The end result is a rich set of data related to locations for any given Internet user and Internet usage session.

Various specific non-limiting examples of geofences may include the following. In a first example, there is a point of interest, and one or more geofences are defined around the point of interest. In this example, the point of interest may be a retail location of an advertiser. The geofences are based on a travel time to the point of interest using various modes of transportation. For example, an advertiser located at the point of interest may wish to define a geofence that includes individuals who are able to travel to the point of interest within a limited period of time. The limited period of time may be arbitrarily chosen by the advertiser. In this example fifteen minutes will be used, although other time periods ranging from a few minutes to several hours are contemplated.

A walking geofence defines a boundary on a physical map that includes locations from which a user may walk to the point of interest with the limited period of time. A driving geofence defines a boundary on the map that includes locations from which a user may drive to the point of interest within the limited period of time. Geofences for various modes of transportation need not be concentric or aligned.

Each geofence for a specific mode of transportation may conform to natural or man-made geographic features that may impact an amount of time a user may need to travel from a location within the geofence to the point of interest. For example, traffic on one or more individual roads may bias the shape of the driving geofence away from traffic congestion. The boundary may be dynamically updated in response to changing traffic conditions. The boundary of the walking geofence may reflect pedestrian specific walkways, sidewalks, trails or publicly accessible routes through or around buildings or other potential pedestrian obstacles.

In one example, there exists a point of interest and various geofences around the point of interest. The point of interest may be a building located at a given location on a map. For example, an advertiser may wish to define a walking geofence by a ten-minute walking time to a retail location located at the point of interest. Similarly, the advertiser may also wish to define a driving geofence by a fifteen-minute drive-time to the retail location located at the point of interest. In an example, a location of traffic congestion may impact the shape or area of the driving geofence, by decreasing the area of the driving geofence in response to an additional amount of time beyond the fifteen-minute criteria defining the driving geofence.

Closing

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. However, although such combinations may be used to provide portions of a computing system, a new, specific machine is configured according to at least one of the technological solutions described above.

Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, over a network, electronic communications sent to a user, each communication associated with a respective location;
   extracting data from a first communication of the received communications, the communication associated with a first location, and the extracted data comprising tracking data associated with a physical object;
   storing the extracted data from the first communication in a data repository;
   after the storing of the extracted data, determining, by at least one processor, a location of a user device of the user;
   determining, by the least one processor, that the location of the user device is within a geofence associated with the first location;
   in response to determining that the location of the user device is within the geofence, transmitting a notification to the user device indicating availability of information associated with the first location, wherein a user interface of the user device presents an option for selection by the user;
   in response to selection of the option by the user, generating, by the least one processor, a new communication, the generating comprising accessing the extracted data in the data repository and including the extracted data in the new communication; and
   transmitting, over a network, by the least one processor, the new communication to cause a display in the user interface of the user device, wherein the display presents the tracking data extracted from the first communication.

2. The method of claim 1, further comprising:
   prior to determining that the location of the user device is within the geofence, extracting data from each of the received communications, including the first communication.

3. The method of claim 1, wherein the first communication comprises metadata, and the extracting of the data from the first communication is performed using the metadata.

4. The method of claim 1, wherein the extracting of the data comprises extracting the data from the first communication based on prior activity of the user device.

5. The method of claim 1, further comprising associating an expiration with the first communication, wherein the transmitting the new communication is subject to determining a status of the expiration.

6. The method of claim 1, further comprising receiving parameters from the user device, wherein the identifying is controlled by the parameters.

7. The method of claim 1, further comprising generating a profile for the user device, the profile comprising data collected from prior network interactions with the user device, wherein the display comprises information selected based on the profile.

8. The method of claim 1, further comprising receiving a profile from the user interface, wherein the generating the new communication is subject to the profile.

9. The method of claim 1, further comprising automatically identifying computing devices of senders that meet relevancy criteria, wherein the transmitting the new communication is subject to a computing device of a sender of the first communication conforming to the relevancy criteria.

10. A system comprising:
a data repository to store electronic communications sent to a user of a user device, each communication associated with a respective location;
at least one processor; and
a non-transitory computer-readable storage medium for tangibly storing thereon program logic for execution by the processor, the program logic comprising:
communication logic executed by the processor for receiving, over a network, the electronic communications, and for transmitting, over the network, a new communication to cause a display in a user interface of the user device;
extraction logic executed by the processor for extracting data from a first communication of the received communications, the first communication associated with a first location, and the extracted data comprising tracking data associated with a physical object;
storage logic executed by the processor for storing the extracted data from the first communication in the data repository;
location logic executed by the processor for determining, after the storing of the extracted data, a location of the user device;
matching logic executed by the processor for determining that the location of the user device is within a geofence associated with the first location; and
generation logic executed by the processor for, in response to determining that the location of the user device is within the geofence, generating the new communication, the generating comprising accessing the extracted data in the data repository and including the tracking data extracted from the first communication in the new communication.

11. The system of claim 10, wherein the first communication comprises metadata, and the data is extracted from the first communication using the metadata.

12. A non-transitory computer-readable storage medium tangibly encoded with computer-executable instructions, that when executed by at least one processor associated with a computing system, performs a method comprising:
receiving, over a network, electronic communications sent to a user of a user device, each communication associated with a respective location;
extracting data from a first communication of the received communications, the first communication associated with a first location, and the extracted data comprising tracking data;
storing the extracted data from the first communication in a data repository;
after the storing of the extracted data, determining a location of the user device;
determining that the location of the user device is within a geofence associated with the first location, the determining comprising accessing the data repository to obtain location data;
in response to determining that the location of the user device is within the geofence, generating a new communication, wherein the tracking data is included in the new communication; and
transmitting, over a network, the new communication to the user device to cause an event on the user device.

13. The non-transitory computer-readable storage medium of claim 12, wherein the method further comprises extracting data from each of the received communications, including the first communication.

14. The non-transitory computer-readable storage medium of claim 12, wherein the extracting of the data comprises extracting the data from the first communication based on prior activity of the user device, and the method further comprising generating a profile for the user device, the profile comprising data collected from at least one prior communication with the user device, wherein the event comprises display of data selected at least based on the profile.

* * * * *